United States Patent [19]
Weldy

[11] Patent Number: 5,373,375
[45] Date of Patent: Dec. 13, 1994

[54] METRIC CONVERSION MECHANISM FOR DIGITAL IMAGES IN A HIERARCHICAL, MULTI-RESOLUTION, MULTI-USE ENVIRONMENT

[75] Inventor: John A. Weldy, Rochester, N.Y.

[73] Assignee: Eastman Kodak Company, Rochester, N.Y.

[21] Appl. No.: 631,709

[22] Filed: Dec. 21, 1990

[51] Int. Cl.$^5$ ................................................. G03F 3/08
[52] U.S. Cl. ................................. 358/523; 358/518; 348/445; 348/441
[58] Field of Search ................. 358/54, 76, 75, 80, 358/523, 521, 515; 348/441, 445

[56] References Cited

U.S. PATENT DOCUMENTS 4,969,204 11/1990 Melnychuck et al. ............ 358/133

*Primary Examiner*—Curtis Kuntz
*Assistant Examiner*—Ping W. Lee
*Attorney, Agent, or Firm*—Edward Dugas

[57] ABSTRACT

A mechanism for facilitating metric conversion of digitized images intended for use with a multi-resolution, multi-application environment is integrated into the encoding and decoding mechanisms of the hierarchical data base, such that stored residual image files contain metric change information. In a preferred embodiment of the invention, the metric conversion operator is executed upon a relatively low spatial resolution file, thereby resulting in a substantial reduction in processing overhead, as advantage is taken of the availability of the reduced size of the lower spatial resolution base file within the hierarchical database, so that a metric conversion may be performed on the relatively small number of pixels within the base file, prior to up-converting the image to a relatively high spatial resolution image, such as a 2048×3072 pixel image for driving a high resolution digital thermal color printer.

28 Claims, 4 Drawing Sheets

METRIC CONVERSION MECHANISM FOR DIGITAL IMAGES IN A HIERARCHICAL, MULTI-RESOLUTION, MULTI-USE ENVIRONMENT

FIELD OF THE INVENTION

The present invention relates in general to digital image processing systems and is particularly directed to a mechanism for facilitating metric conversion of digitized images that are intended for use with a multi-resolution, multi-application environment.

BACKGROUND OF THE INVENTION

Recent improvements in their spatial and data resolution capability have made digital image processing systems particularly attractive for multi-use environments, in which the user has the option of selecting the type of reproduction device and the desired resolution of the reproduction device. In still color image photography, for example, when an image, that has been captured on color photographic film or a high spatial resolution color digital camera, is digitized and stored in an attendant data base, it can be readily optimized for reproduction on a variety of output devices (e.g. a color video display or a digitally driven, high resolution color thermal printer) through the use of workstation-resident image processing software.

One example of a digitized image processing system that takes advantage of this capability is the color photo-finishing system disclosed in co-pending patent application Ser. No. 582,305, filed Sep. 14, 1990, by S. Kristy entitled "Multi-resolution Digital Imagery Photofinishing System," assigned to the assignee of the present application and the disclosure of which is herein incorporated. As explained in that application, conventional photo-finishing of consumer-generated still color photographs (e.g. those captured on 35 mm color film) customarily involves the use of an analog electro-optic system and an associated chemical-based print developing unit. The Kristy application describes a digital image-based photofinishing apparatus that enables the user to personally customize and obtain high quality prints of photographic images. It also provides for the storage and retrieval of high spatial resolution digitized color still images for playback to a variety of reproduction devices, the spatial resolution of which may vary.

FIG. 1 diagrammatically illustrates such an improved photofinishing apparatus as employing a high spatial resolution opto-electronic film scanner 12, the output of which is coupled to a host digitized image processor 14. By high spatial resolution is meant a pixel array of a size and density sufficient to provide color print quality images normally provided by analog optical systems. Scanner 12 may comprise a commercially available Eikonix Model 1435 high spatial resolution scanner, having a very high spatial resolution sensor pixel array (a 3072×2048 pixel matrix) capable of generating high spatial density-representative output signals which, when converted into digital format, yield 'digitized' photographic image files from which high quality color prints may be obtained. Scanner 12 is arranged to be optically coupled with a photographic recording medium, such as a consumer-supplied 35 mm color film strip 16. Film strip 16 typically contains a plurality (e.g. a set of twenty-four or thirty-six) 36 mm ×24 mm color image frames. For each scanned image frame, scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied to host processor 14 in the form of an imaging pixel array-representative bit map, resolved to a prescribed digital code width (e.g. eight bits per color per pixel). Host processor 14 has a resident image-encoding and storage operator through which each high spatial resolution digitized image file may be stored in a multi-resolution, hierarchical format. The use of such a multi-resolution, hierarchical storage format facilitates retrieval of images for reproduction by a variety of devices the resolution of which may vary from device to device, such as a low/moderate NTSC television monitor or a very high resolution, digitally driven, color thermal printer.

One example of a preferred encoding and storage operator that may be used for this purpose is described in U.S. Pat. No. 4,969,204, issued Nov. 6, 1990, entitled "A Hybrid Residual-Based Hierarchical Storage and Display Method for High Resolution Digital Images in a Multi-use Environment," by Paul W. Melynchuck et al, assigned to the assignee of the present application and the disclosure of which is herein incorporated. As described in the Melynchuck et al application, an original high spatial resolution (2048×3072) image may be sequentially decomposed into a hierarchical set of respectively different resolution residual images plus a base resolution image file. The base resolution file may comprise a 512×768 pixel array file formatted as a set of four interlaced (256 lines by 384 pixels/line) lowest resolution image sub-arrays, respectively corresponding to odd pixel/odd line, odd pixel/even line, even pixel-/odd line, even pixel/even line sub-arrays. One of the lowest resolution image (256×384) sub-arrays is suitable for preliminary display on an NTSC-quality video monitor, while the full 512×768 base resolution array provides a high quality image on a an NTSC video monitor. An individual lowest resolution 256×384 sub-array may be further sub-sampled to obtain one or more lower resolution files (e.g. a 128×192 pixel sub-array) for supporting the display of one or more relatively smaller images. The spatial parameters of each of the hierarchical image files into which an original (2048×3072) digitized image file is encoded and stored are chosen to facilitate the implementation and incorporation of a low cost, reduced complexity frame store/-data retrieval architecture into a variety of reproduction devices, thereby providing for rapid call-up and output (display or print out) of one or more selected images.

Now, although a multi-resolution, multi-use system, such as described in the above-referenced Kristy application, affords rapid access to a variety of image formats and allows the user to select the reproduction medium and the spatial resolution at which the accessed image is reproduced, there still remains the problem of adjusting the parameters of the digitized image file in the event that a change in metric, for example a change in color metric, is required.

More specifically, with the ability of a multi-resolution, multi-use imaging storage and retrieval mechanism to drive a wide variety of output devices, it can be expected that the metric of a chosen output device may not necessarily match that of a selected image stored in the multi-resolution data base. Consequently, before imagery data to be accessed from the hierarchical data base is supplied to a selected output device, it must undergo a metric conversion. One way to adjust the image is to install a metric conversion operator between the data base and the output device. However, depending upon the complexity of the metric conversion required and the spatial resolution of the output device, the computational intensity of the metric conversion operator can become quite significant in terms of processing overhead.

In this context, it is observed that a metric change may involve anything from a single channel independent modification to a series of multi-channel color space transformations. Although a low level metric change may not require a significant amount of additional image processing, executing a more intense metric change in a very high spatial resolution application, such as in the case of a 2040×3072 pixel array thermal printer, can be particularly computationally intensive.

SUMMARY OF THE INVENTION

Pursuant to the present invention, rather than take a brute force approach of adding, at the output of the data base, whatever metric conversion operator is required in order to accommodate the metric differential and is compatible with the spatial resolution of the driven output device, the metric conversion operator is integrated into the encoding and decoding mechanisms of the hierarchical data base, such that stored residual image files contain metric change information. Moreover, in a preferred embodiment of the invention, the metric conversion operator is executed upon a relatively low spatial resolution file, thereby resulting in a further reduction in processing overhead.

More particularly, advantage is taken of the availability of the reduced size of the lower spatial resolution base file within the hierarchical database, so that a metric conversion may be performed on the relatively small number of pixels within the base file, prior to up-converting the image to a relatively high spatial resolution image, such as a 2048×3072 pixel image for driving a high resolution digital thermal color printer. Namely, rather than apply an image conversion operator, such as a color metric change, directly to an image file that has the same spatial resolution as the associated output device, the conversion operator may be applied to a lower spatial resolution image file where the computational requirements are is considerably less intense than for a high spatial resolution image.

Pursuant to a first embodiment of the invention, where a metric conversion of a high spatial resolution image is required, for example where the color metric of a thermal printer differs from that of the digitized image, which might be for video display, the high resolution image is first decomposed, as by way of the hierarchical decomposition mechanism described in the above-referenced Melynchuck et al application, into a low spatial resolution image file. A metric conversion operation necessary to place the stored image in the same color space as the reproduction characteristics of the driven output device is then executed on the digitized image data of the low spatial resolution image file, so as to produce a 'modified metric' low spatial resolution image file, which is stored. Since the number of pixel entries (e.g. 384×512 pixels) within this lower spatial resolution image file is considerably less than the contents (e.g. 2048×3072 pixels) of the high spatial resolution file, the amount of data that must be processed in the metric conversion calculation is reduced to a manageable level. The stored modified metric low spatial resolution image file is then subjected to a predictor mechanism, in order to reconstruct a high spatial resolution image having a color metric that has been modified to conform with that of the target output device.

In order to provide the ability to recover the original metric of the high spatial resolution image from the stored modified metric low spatial resolution image file, the modified high spatial resolution image is further combined with (subtracted from) the original high spatial resolution image. The result is a residual image containing both spatial and (color) metric information relating to the original high spatial resolution image. This residual image is then stored as an adjunct to the stored modified metric low resolution image file.

To recover the original metric high spatial resolution image, the stored modified metric base image file is subjected to a predictor mechanism to reconstruct the modified metric high spatial resolution image. This modified metric high spatial resolution image is then combined (summed) with the residual image file to reconstruct the original metric high spatial resolution image.

Pursuant to a modification of this first embodiment of the invention, rather than initially decompose the high resolution image into a low spatial resolution image file, the color metric of the high resolution image is converted into the color metric of the output device, as to produce a high spatial resolution, converted-metric digitized image. The spatial resolution of the converted-metric digitized image is then reduced to a lower spatial resolution, thereby producing a 'modified metric' low resolution image file, which is stored. Again, the first stored modified metric base image file is subjected to a predictor mechanism, in order to reconstruct a high spatial resolution image having a color metric that has been modified to conform with that of the output device.

To recover the color metric of the original high spatial resolution image from the stored 'modified metric' lower resolution image file, the modified high spatial resolution image is subtracted from the original high spatial resolution image, to produce a residual image containing both spatial and color metric information about the high resolution image. This residual image is then stored as part of the hierarchical database.

To reconstruct the original metric high spatial resolution image, the stored modified metric base image file is subjected to a predictor mechanism, to derive a modified metric high spatial resolution image. This modified metric high spatial resolution image is then summed with the residual image file, which yields the original metric high spatial resolution image.

Pursuant to a second embodiment of the invention, the spatial resolution of the high resolution image is reduced, to provide a low spatial resolution image file. The color metric of this low spatial resolution image file is the converted to a second color metric, so as to produce a 'modified metric' low resolution image file, which is stored, as in the first embodiment. The stored, modified metric, low resolution base image file is then subjected to a further metric conversion step, which performs an inverse metric operation on the modified metric image file, yielding a low spatial resolution image file having the same color metric as the original high spatial resolution image.

Through a prediction operator, the spatial resolution of this image file is then increased to the high spatial resolution, to produce a high resolution image, the content of which differs from the original image essentially in terms of its color metric. The resulting image is further subtracted from the original high spatial resolution image, producing a residual image containing only color metric information. This residual image is then stored. To recover the original metric high spatial resolution image, the stored modified metric base image file is subjected to a color metric conversion operator, producing a low resolution image having the same color metric as the original image. This low resolution image is subjected to a predictor mechanism, to derive a 'predictor-generated', high spatial resolution image. This predictor-generated, high spatial resolution image is then summed with the residual image file to reconstruct the original high spatial resolution image.

Similar to the first embodiment, the second embodiment may be modified such that, rather than initially decompose the high resolution image into a low spatial resolution image file, the color metric of the high resolution image is first converted into the color metric of the output device, as to produce a high spatial resolution, converted-metric digitized image. The spatial resolution of the converted-metric digitized image is then reduced to a lower spatial resolution, thereby producing a 'modified metric' low resolution image file, which is stored. The stored, modified metric, low resolution base image file is then subjected to a further metric conversion step, which performs an inverse metric operation on the modified metric image file, yielding a low spatial resolution image file having the same color metric as the original high spatial resolution image.

Again, a prediction operator is used to increase the spatial resolution of this image file back to the high spatial resolution of the original image, yielding a high resolution image, the content of which differs from the original image essentially in terms of its color metric. The resulting image is further subtracted from the original high spatial resolution image, producing a resolution image containing only color metric information. This residual image is then stored. To recover the original metric high spatial resolution image, the stored modified metric base image file is subjected to a color metric conversion operator, producing a low resolution image having the same color metric as the original image. This low resolution image is subjected to a predictor mechanism, to derive a 'predictor-generated' high spatial resolution image. This predictor-generated, high spatial resolution image is then summed with the residual image file to reconstruct the original high spatial resolution image.

Where a color metric change is required only in the case of a low spatial resolution image, provision for a color metric change may be accomplished by storing a low resolution version of the original image and a low spatial resolution metric residual. In this circumstance, the color metric conversion operator is applied to the stored low spatial resolution file of the hierarchical database, to derive a modified color metric low resolution file. This modified color metric low spatial resolution file is then subtracted from the stored file to produce a low spatial resolution, metric residual image, which is stored. When a low resolution modified color metric image is required, for example, to drive a low resolution color video display, the stored residual file is summed with the low resolution file in the hierarchical database.

DETAILED DESCRIPTION

Figure 1:
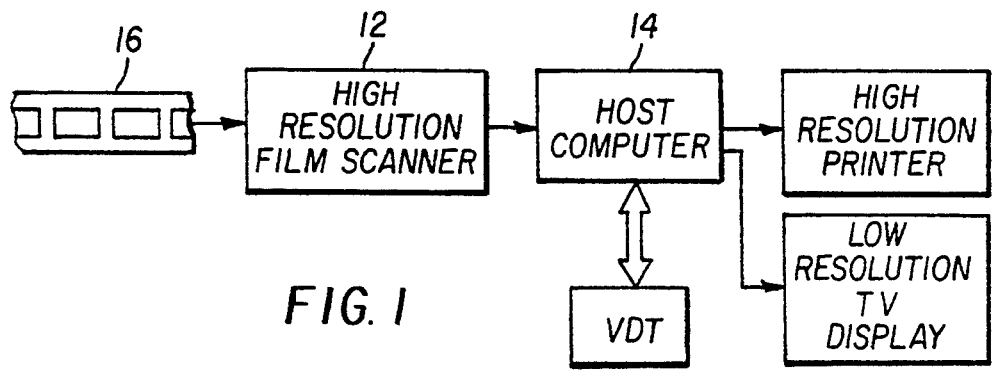
FIG. 1 diagrammatically illustrates a digital image-based photofinishing apparatus having multi-resolution, multi-use capability that provides for the storage and retrieval of high spatial resolution digitized color still images for playback to a variety of reproduction devices, the spatial resolution of which may vary.

Before describing in detail the particular improved digital image metric conversion mechanism for a multi-resolution, multi-application environment in accordance with the present invention, it should be observed that the present invention resides primarily in a novel structural combination of conventional digital imagery processing modules (digital image conversion/transformation operators) and not in the details thereof. Accordingly, the format, control and linking of these modules have been illustrated in the drawings by readily understandable block diagrams which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood. As a matter of convention, double lined blocks in the figures represent the fact that images resulting respective processing operations are stored in the database.

As pointed out briefly above, the metric conversion mechanism in accordance with the present invention is integrated into the encoding and decoding mechanisms of a multi-resolution, multi-use digitized image processing system, so as to provide stored residual image files that contain metric change information, (e.g. color metric change information). Depending upon the complexity of the statistics of the resulting residual metric files, the metric conversion mechanism may also provide spatial information as part of a residual image, for example where the residual images readily lend themselves to (entropy/arithmetic) encoding. To minimize processing overhead, advantage is taken of the availability of the reduced size of a lower spatial resolution file within the hierarchical database, so that a metric conversion may be performed on the relatively small number of pixels, prior to performing a up-converting the image to a relatively high spatial resolution image.

It should also be noted that the term metric, as employed in the present description, is used in a non-limiting sense and is not directed to any specific type of image parameter or to a specific set parameters. Consequently, a metric change may include anything from something as simple as a single channel level shift to a series of multi-channel color space transformations. Also, the metric conversion operator is not limited to a specific type of module or given set of parameters upon which the module operates. For example, in the case of a multiple (e.g. three) channel color space transformation, color translation matrices and associated look-up tables may be executed in cascade. Exemplary color space transformation operators include a primary conversion matrix for converting from one primary color system to another, such as that described on page 217, for example, of "THE TELEVISION ENGINEERING", K. Blair Benson, Editor in Chief, Published by McGraw-Hill, 1986. Thus, in the following description of the preferred embodiments of the invention, it is to be understood that these or other functionally equivalent transformation modules may be employed.

Figure 2:
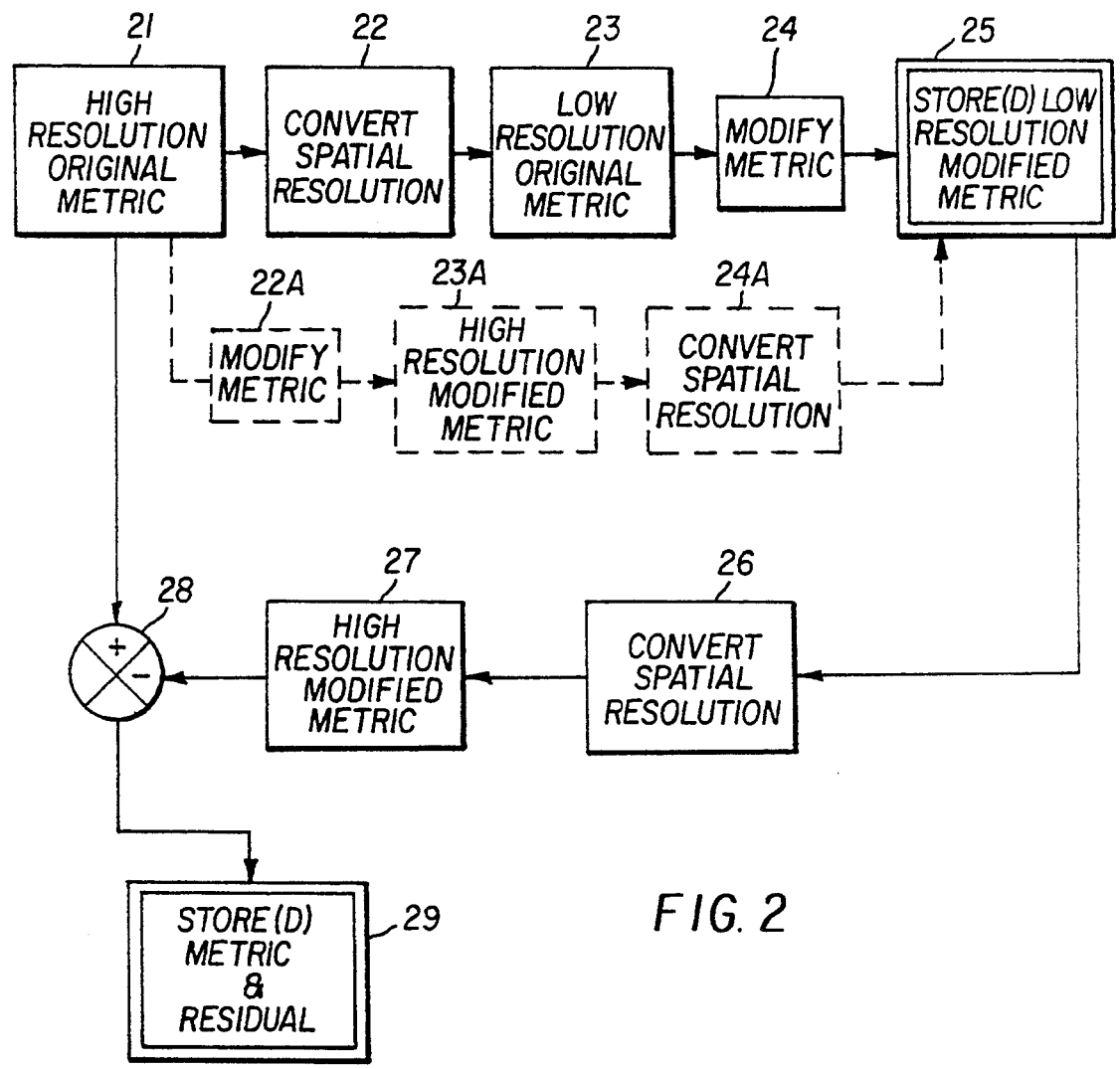
FIGS. 2, 4 and 6 diagrammatically illustrate image-encoding portions of respective first, second and third embodiments of the invention.

FIG. 2 diagrammatically illustrates an image-encoding portion of a first embodiment of the invention, where a metric conversion of a high spatial resolution image is required. For example, in the environment of a photo-finishing apparatus described in the above-referenced Kristy application, the color metric of the original high spatial resolution image may not be compatible with that of an output device, such as a high resolution thermal printer. In accordance with the first embodiment of the invention, shown in FIG. 2, a high spatial resolution image 21, such as a 2048 X 3072 pixel image, such as supplied by a high spatial resolution opto-electronic film scanner in a system of the type described in the previously referenced Kristy application, is subjected to an image processing operator, such that the spatial resolution and the color metric of the original image are modified, to produce a second digitized image having a second spatial resolution and a second prescribed image metric.

For this purpose, image 21 may be initially decomposed along path 22, which may contain a low pass filter, subsample mechanism described in the above-referenced Melynchuck et al patent, into a low spatial resolution image file 23. The spatial resolution of image file 23 is not limited to any particular size/compaction of pixels, but is substantially lower than that of image 21, in order to provide a practical savings in computational complexity. Thus, where image file 21 has a spatial resolution of 2048×3072 pixels, image 23 may contain an array of 1024×1536 pixels or an array of 512×768 pixels, for example. Low spatial resolution image file 23 is then subjected to a metric conversion operation along path 24, in order to transform the contents of the low spatial resolution image into a color metric that provides an unencumbered path to the reproduction characteristics of a low resolution output device. Thus the metric conversion operation of path 24 yields a 'modified metric' low spatial resolution image file 25, which is stored, so that it may be used to both provide an unencumbered path to a low resolution display and to reconstruct high resolution images in any metric (but primarily in the original).

Via a predictor path 26 (such as a linear interpolation operation described in the Melynchuck application), the spatial resolution of modified metric, low resolution image file 25 is increased to the same spatial resolution as the original image 21, so as to provide a 'predicted', modified metric high resolution image 27 having a metric that has been modified to conform with that of a high resolution output device.

In order to provide the ability to recover the color metric of the original high spatial resolution image from the stored modified metric base image file, the modified metric high spatial resolution image 27 is subtracted at 28 from the original high spatial resolution image 21 to obtain a residual image 29. Because both metric and spatial transformations have been carried out on the original image file 21, in order to form the low resolution modified metric image file 25, residual image 29 contains both spatial and color metric information. This residual image is then stored as an adjunct to the stored modified metric low resolution image file 25.

Figure 3:
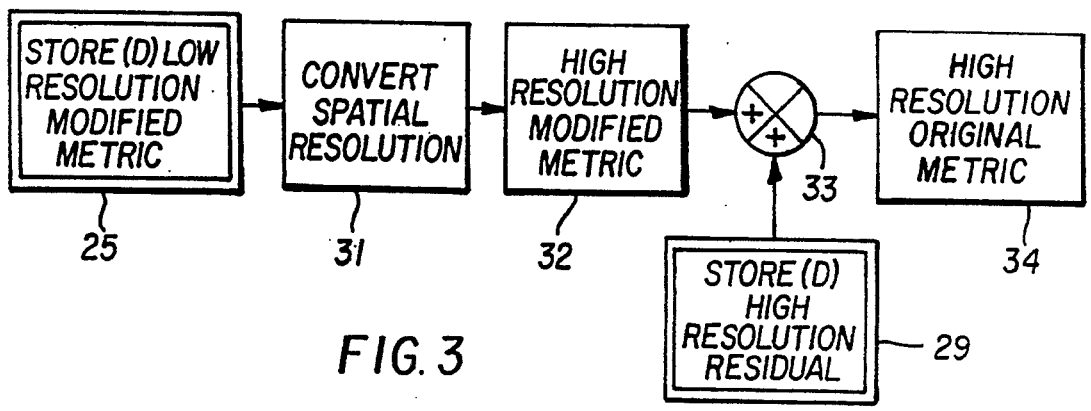
FIGS. 3, 5 and 7 diagrammatically illustrate image-decoding portions of respective first, second and third embodiments of the invention.

FIG. 3 shows a decoding portion of the first embodiment of the invention, specifically the manner in which the original metric high spatial resolution image 21 is reconstructed using previously stored modified metric, low resolution image file 25 and residual image file 29. Low resolution image file 25 is subjected to a predictor mechanism via path 31 to obtain a predicted modified metric high spatial resolution image 32, which effectively corresponds to predicted file 27 of FIG. 2. This modified metric high spatial resolution image 32 is then summed at 33 with the residual image file 29 to reconstruct high resolution image 34, which effectively corresponds to original image 21.

A modification of the encoding portion of the first embodiment of the present invention is diagrammatically shown in broken lines in FIG. 2. Rather than initially decompose the high resolution image 21 into low spatial resolution image file 23, the color metric of high resolution image 21 is converted, via metric conversion path 22A, into a high resolution image 23A having the same color metric of the output device. The spatial resolution of converted-metric digitized image 23A is then reduced to a lower spatial resolution, via decomposition path 24A, thereby producing 'modified metric' low resolution image file 25, which is stored. It should be noted that the encoding portion of this modification of the first embodiment of the invention requires additional processing at metric convert path 24A. Depending upon the spatial resolution of the high resolution image, the choice of this alternative approach to generating low resolution, converter metric image file 25 may not be as preferable as the first technique of initially reducing the spatial resolution prior to converting its color metric from a standpoint of processing complexity.

Figure 4:
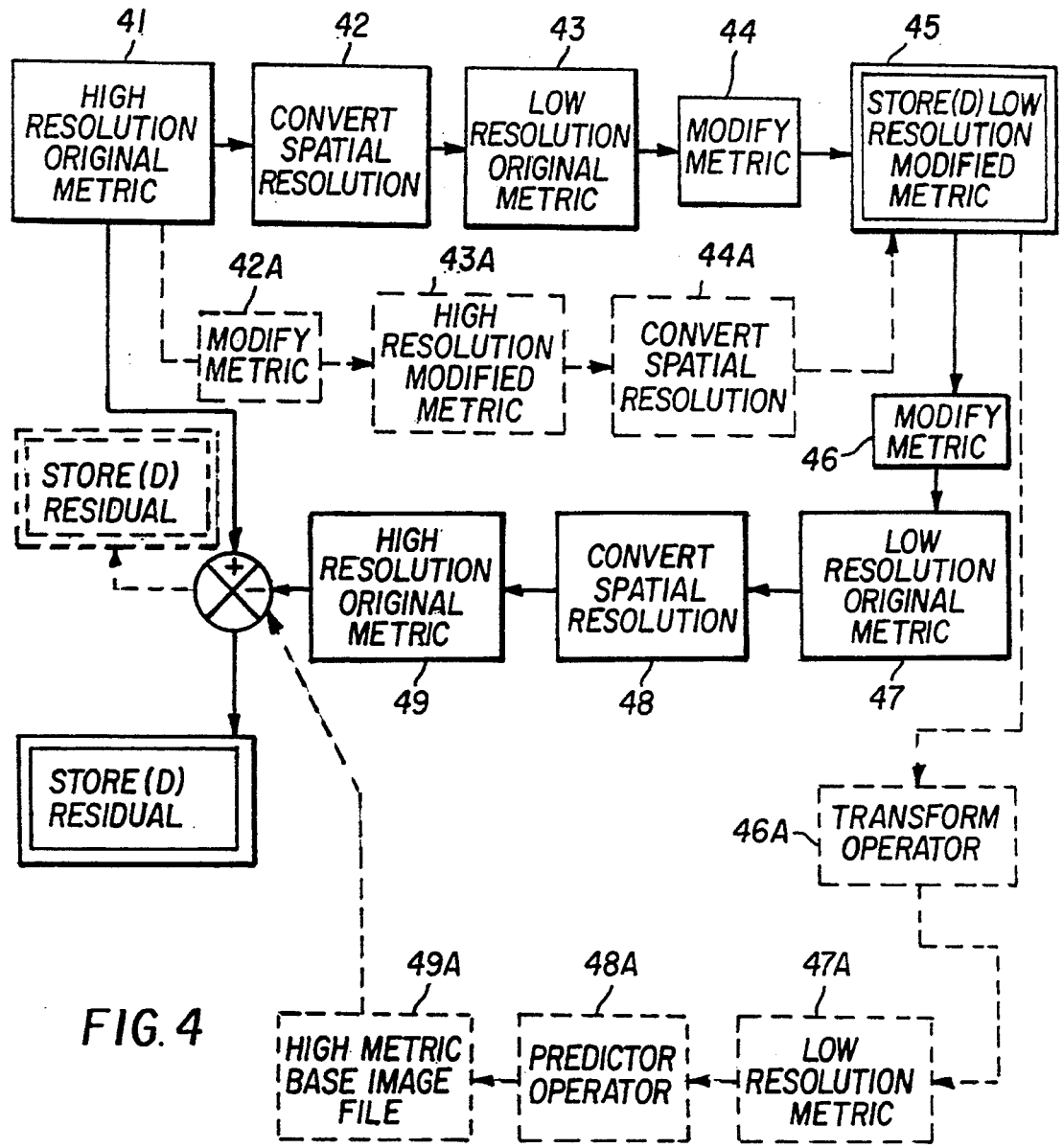

FIG. 4 shows an encoding portion of a second embodiment of the invention. As in the first embodiment, the spatial resolution of a high resolution image 41 is reduced. As in the first embodiment, the spatial resolution of image 41 may be initially decomposed along path 42 into a low spatial resolution image file 43. Low resolution image file 43 is then subjected to a metric conversion operation along path 44 to transform the contents of the low spatial resolution image into a color metric that provides an unencumbered path to the reproduction characteristics of the low resolution driven output device, thereby generating a 'modified metric' low resolution image file 45, which is stored. Via an inverse metric change path 46, low resolution, 'modified metric' image file 45 is then subjected to an inverse or complement metric conversion operation along path 44, thereby transforming the contents of the modified metric low resolution image 45 back into the same color space as the original image, or into an image file 47 that is the equivalent of low resolution image file 43. Using a predictor operator along path 48, the spatial resolution of image 47 is increased to the same spatial resolution as the original image 41, so as to provide a 'predicted', modified metric high resolution image 49 having the same color metric as image 41.

In some circumstances imparting a true inverse metric change to modified metric low resolution image file 45 may result an image file having statistical characteristics that are less amenable to compression than a 'partial inverse' metric modification of image file 45 that is less than a true inverse, but still contains sufficient information about the image to permit a high fidelity reconstruction for the image. The use of such an optional 'partial inverse' path is shown in FIG. 4 as broken line path 46A, which transforms the contents of the modified metric low resolution image 45 into a reduced computational intensity metric image file 47A. Via predictor operator path 48A, the spatial resolution of image file 47A is then increased to the same spatial resolution as the original image 41, so as to provide a 'predicted', modified metric high resolution image 49A having a color metric that is similar to but not identical with that of image 41.

To recover the metric of the original high spatial resolution image from the stored modified metric base image file, the contents of image file 49 (or image 49A) are subtracted at 50 from the original high spatial resolution image 41 to obtain a residual image 51, or 51A. Unlike the first embodiment, because of the inverse or complementary color metric conversion operation of processing path 46, residual image 51 contains only spatial information. Thus, the statistics of this resulting residual spatial file tend to more readily lend themselves to entropy or arithmetic encoding, thereby reducing processing overhead.

The encoding portion of the second embodiment of the invention may be modified in the same manner as in the first embodiment, as diagrammatically shown in broken lines in FIG. 4. Namely, high resolution image 41 initially undergoes a metric conversion, via metric conversion path 42A, to produce a high resolution image 43A having the metric of the output device. The spatial resolution of converted-metric digitized image 43A is then reduced to a lower spatial resolution, via decomposition path 44A, to obtain 'modified metric' low resolution image file 45, which is stored.

Figure 5:
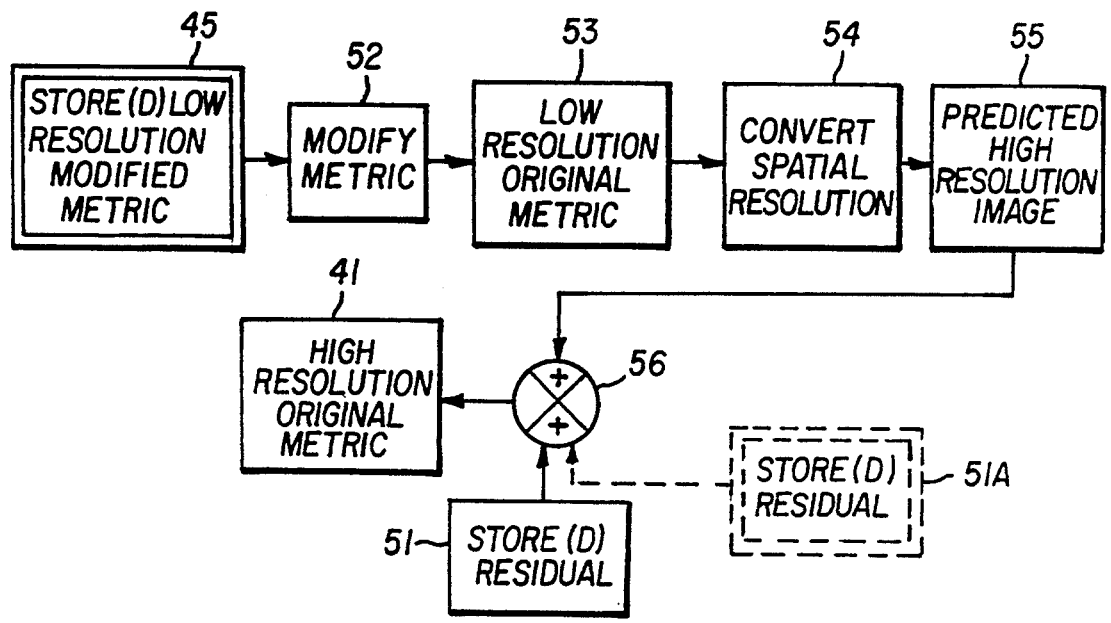

FIG. 5 shows a decoding portion of the second embodiment of the invention. The previously stored low resolution, modified metric image file 45 is subjected to an inverse metric conversion operation via path 52, so as to low resolution image 53. Using a predictor operator along path 54, the spatial resolution of low resolution image 53 is increased to the same spatial resolution as the original image 41, so as to provide a 'predicted', modified metric high resolution image 55 having the same metric as image 41. This modified metric high spatial resolution image 55 is then summed at 56 with the residual image file 51 to reconstruct original metric high spatial resolution image 41. In the case of residual image 51A, modified metric high spatial resolution image 55 is summed with the residual image file 51A to reconstruct original metric high spatial resolution image 41, as shown in broken lines in FIG. 5.

Figure 6:
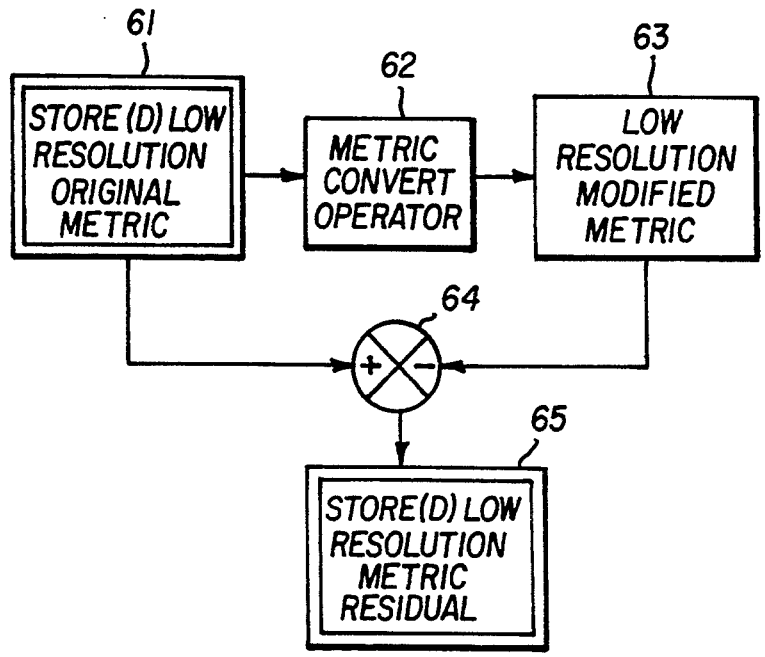
Figure 7:
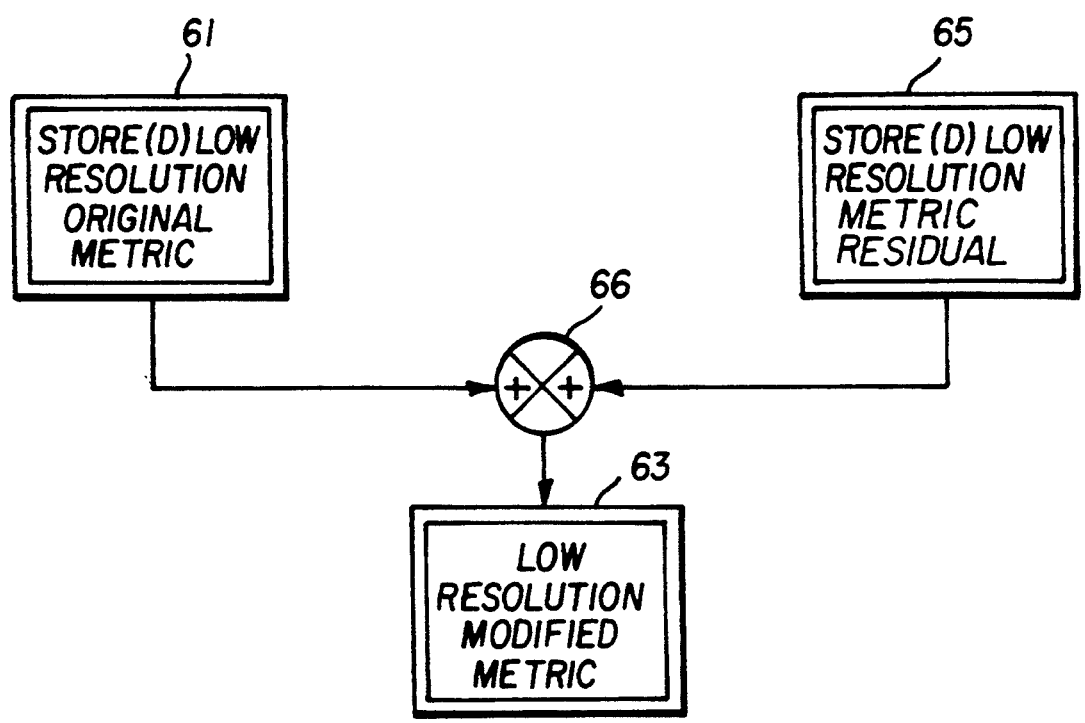

Although the foregoing embodiments are associated with the case where a metric change is accomplished by processing images of respectively different spatial resolutions, where a metric change is required only in the case of a given (e.g. low) spatial resolution image, provision for a metric change may be accomplished by storing a low resolution version of the original image and a low spatial resolution metric residual, as diagrammatically illustrated in FIGS. 6 and 7.

In the operation of the encoding portion, shown in FIG. 6, a stored low spatial resolution file 61 is subjected to a metric conversion operator 62, to derive a modified metric (low resolution) file 63. Modified metric file is then subtracted at 64 from the stored file 61 to produce a (low spatial resolution) modified metric residual image file 65, which is stored. Modified metric image 63 may then be reconstructed in the manner shown in FIG. 7. Specifically, when a modified metric image is required, for example, to drive a low resolution video display, the stored residue file 65 and the stored base file 61 are summed at 66 to produce modified metric image 63.

As will be appreciated from the foregoing description, the present invention, by integrating the metric conversion operator into the encoding and decoding mechanisms of a hierarchical data base, it is possible to provide one or more stored residual image files that contain metric change information and thereby facilitate the outputting of processed digital images to a variety of output devices of varying resolution and color space parameters. Advantageously, the metric conversion operator may be executed upon a relatively low spatial resolution file, thereby resulting in a substantial reduction in processing overhead.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of processing a first digitized image having a first spatial resolution and a first prescribed image metric comprising the steps of:
   (a) modifying the first spatial resolution and first prescribed image metric of said first digitized image to produce a second digitized image having a second spatial resolution and a second prescribed image metric;
   (b) modifying the second spatial resolution of said second digitized image to produce a third digitized image having said first spatial resolution and said second prescribed image metric; and
   (c) combining said first and third digitized images to produce a residual image containing residual spatial and prescribed image metric information.

2. A method according to claim 1, wherein said second spatial resolution is lower than said first spatial resolution.

3. A method according to claim 2, wherein each of the first and second prescribed image metric corresponds to a multi-channel image color metric.

4. A method according to claim 3, wherein each of the first and second prescribed image metric corresponds to a trichromatic color metric.

5. A method according to claim 3, wherein each of the first and second prescribed image metric corresponds to a four color metric.

6. A method according to claim 1, wherein step (a) comprises
   (a1) reducing the spatial resolution of said first digitized image to produce a lower spatial resolution digitized image having said second spatial resolution, lower than said first spatial resolution, and said first prescribed image metric, and (a1) converting the first prescribed image metric of said lower spatial resolution digitized image to said second prescribed image metric, thereby producing said second digitized image having said second spatial resolution and said second prescribed image metric.

7. A method according to claim 6, wherein step (b) comprises increasing the spatial resolution of said second digitized image to said first spatial resolution, thereby producing said third digitized image.

8. A method according to claim 1, wherein step (a) comprises (a1) converting the first prescribed image metric of said first digitized image to said second prescribed image metric, so as to produce a converted-metric digitized image having said first spatial resolution and said second prescribed image metric, and (a2) reducing the spatial resolution of said converted-metric digitized image to said second spatial resolution, thereby producing said second digitized image having said second spatial resolution and said second prescribed image metric.

9. A method according to claim 8, wherein step (b) comprises increasing the spatial resolution of said second digitized image to said first spatial resolution, thereby producing said third digitized image.

10. A method according to claim 1, wherein step (c) comprises taking the difference between said first and third digitized images to produce said residual image.

11. A method according to claim 1, further comprising the steps of:

(d) combining said residual image with said third digitized image so as to reconstruct said first digitized image having said first spatial resolution and said first prescribed image metric.

12. A method according to claim 1, wherein step (a) includes storing said second digitized image, and step (c) includes storing said residual image and further comprising the steps of:

(d) modifying the spatial resolution of the stored second digitized image to produce a fourth digitized image having said first spatial resolution and said second prescribed image metric; and (e) combining the stored residual image with said fourth digitized image so as to reconstruct said first digitized image having said first spatial resolution and said first prescribed image metric.

13. A method of processing a first digitized image having a first spatial resolution and a first prescribed image metric comprising the steps of:

(a) modifying the first spatial resolution and first prescribed image metric of said first digitized image to produce a second digitized image having a second spatial resolution and a second prescribed image metric;

(b) modifying the second spatial resolution and second prescribed image metric of said second digitized image to produce a third digitized image having said first spatial resolution and said first prescribed image metric; and (c) combining said first and third digitized images to produce a residual image containing residual prescribed image metric information.

14. A method according to claim 13, wherein said second spatial resolution is lower than said first spatial resolution.

15. A method according to claim 13, wherein each of the first and second prescribed image metric corresponds to an image color metric.

16. A method according to claim 13, wherein each of the first and second prescribed image metric corresponds to a trichromatic color metric.

17. A method according to claim 13, wherein each of the first and second prescribed image metric corresponds to a four color metric.

18. A method according to claim 13, wherein step (a) comprises (a1) reducing the spatial resolution of said first digitized image to produce a lower spatial resolution digitized image having said second spatial resolution, lower than said first spatial resolution, and said first prescribed image metric, and (a2) converting the first prescribed image metric of said lower spatial resolution digitized image to said second prescribed image metric, thereby producing said second digitized image having said second spatial resolution and said second prescribed image metric.

19. A method according to claim 18, wherein step (b) comprises the steps of (b1) converting the second prescribed image metric of said second digitized image to said first prescribed image metric, so as to produce a reconverted-metric digitized image having said second spatial resolution and said first prescribed image metric, and (b2) increasing the spatial resolution of said reconverted-metric digitized image to said first spatial resolution, thereby producing said third digitized image having said first spatial resolution and said first prescribed image metric.

20. A method according to claim 13, wherein step (a) comprises (a1) converting the first prescribed image metric of said first digitized image to said second prescribed image metric, so as to produce a converted-metric digitized image having said first spatial resolution and said second prescribed image metric, and (a2) reducing the spatial resolution of said converted-metric digitized image to said second spatial resolution, thereby producing said second digitized image having said second spatial resolution and said second prescribed image metric.

21. A method according to claim 20, wherein step (b) comprises the steps of (b1) converting the second prescribed image metric of said second digitized image to said first prescribed image metric, so as to produce a reconverted-metric digitized image having said second spatial resolution and said first prescribed image metric, and (b2) increasing the spatial resolution of said reconverted-metric digitized image to said first spatial resolution, thereby producing said third digitized image having said first spatial resolution and said first prescribed image metric.

22. A method according to claim 13, wherein step (c) comprises taking the difference between said first and third digitized images to produce said residual image.

23. A method according to claim 13, further comprising the steps of:
(d) combining said residual image with said third digitized image so as to reconstruct said first digitized image having said first spatial resolution and said first prescribed image metric.

24. A method according to claim 13, wherein step (a) includes storing said second digitized image, step (c) includes storing said residual image and further comprising the steps of:
(d) modifying the spatial resolution and prescribed image metric of the stored second digitized image to produce a fourth digitized image having said first spatial resolution and said first prescribed image metric; and
(e) combining said stored residual image with said fourth digitized image so as to reconstruct said first digitized image having said first spatial resolution and said first prescribed image metric.

25. A method according to claim 24, wherein step (d) comprises the steps of
(d1) converting the second prescribed image metric of said second digitized image to said first prescribed image metric, so as to produce said reconverted-metric digitized image having said second spatial resolution and said first prescribed image metric, and
(d2) increasing the spatial resolution of said reconverted-metric digitized image to said first spatial resolution,
thereby producing said third digitized image having said first spatial resolution and said first prescribed image metric.

26. A method according to claim 13, wherein step (b) comprises the steps of
(b1) converting the second prescribed image metric of said second digitized image to said first prescribed image metric, so as to produce a reconverted-metric digitized image having said second spatial resolution and said first prescribed image metric, and
(b2) increasing the spatial resolution of said reconverted-metric digitized image to said first spatial resolution,
thereby producing said third digitized image having said first spatial resolution and said first prescribed image metric.

27. A method of processing a first digitized image having a first spatial resolution and a first prescribed image metric comprising the steps of:
(a) modifying the first spatial resolution and first prescribed image metric of said first digitized image to produce a second digitized image having a second spatial resolution and a second prescribed image metric;
(b) converting the second prescribed image metric of said second digitized image to a third image metric, so as to produce a converted-metric digitized image having said second spatial resolution and a third image metric;
(c) increasing the spatial resolution of said converted-metric digitized image to said first spatial resolution, thereby producing a third digitized image having said first spatial resolution and said third image metric; and
(d) combining said first and third digitized images to produce a residual image containing residual prescribed image metric information.

28. A method according to claim 27, wherein step (a) includes storing said second digitized image, step (d) includes storing said residual image, and further comprising steps of:
(e) modifying the spatial resolution and prescribed image metric of the stored second digitized image to produce a fourth digitized image having said first spatial resolution and said first prescribed image metric; and
(f) combining said stored residual image with said fourth digitized image so as to reconstruct said first digitized image having said first spatial resolution and said first prescribed image metric.

* * * * *